(12) United States Patent
Camagna et al.

(10) Patent No.: US 6,707,868 B1
(45) Date of Patent: Mar. 16, 2004

(54) APPARATUS FOR RECOVERING TIMING OF A DIGITAL SIGNAL FOR A TRANSCEIVER

(75) Inventors: John R. Camagna, El Dorado Hill, CA (US); James Ward Girardeau, Jr., Sacramento, CA (US); Stanley K. Ling, Sacramento, CA (US); Hiroshi Takatori, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/291,136

(22) Filed: Apr. 12, 1999

(51) Int. Cl.[7] .................................................. H04L 7/00
(52) U.S. Cl. ..................... 375/371; 375/229; 375/355
(58) Field of Search .................................. 375/211, 219, 375/220, 221, 222, 229, 230, 232, 233, 295, 316, 354, 355, 371–376; 327/141, 155, 156, 162, 163; 370/503, 516; 455/73, 75, 76, 260

(56) References Cited

U.S. PATENT DOCUMENTS

| | | | |
|---|---|---|---|
| 4,535,206 A | | 8/1985 | Falconer ..................... 370/286 |
| 5,020,078 A | | 5/1991 | Crespo ........................ 375/233 |
| 5,278,865 A | * | 1/1994 | Amrany et al. .............. 375/219 |
| 5,513,209 A | | 4/1996 | Holm .......................... 375/354 |
| 5,521,949 A | * | 5/1996 | Huang et al. ................ 375/377 |
| 5,581,585 A | | 12/1996 | Takatori et al. ............. 375/376 |
| 5,703,904 A | * | 12/1997 | Langberg .................... 375/232 |
| 6,304,582 B1 | * | 10/2001 | Zhang et al. ................ 370/503 |
| 6,341,148 B1 | * | 1/2002 | Girardeau, Jr. ............. 375/355 |

FOREIGN PATENT DOCUMENTS

SE WO 98/10547 A2 * 3/1998 ............. H04L/5/06

* cited by examiner

Primary Examiner—Chieh M. Fan
(74) Attorney, Agent, or Firm—Blakely, Sokoloff, Taylor & Zafman LLP

(57) ABSTRACT

A digital timing recovery system wherein the rate conversion is independent of the sampling rate, and which may be set in a network mode or a remote mode. The invention includes a transceiver core for processing transmit and receive data at a predetermined baud rate, an analog front end for transmitting and receiving analog signals over a network, a phase detector for generating a phase error estimate and a timing controller for receiving the phase error estimate signal and generating a receive and transmit phase control signal for controlling timing of the analog front end. A selector is provided for selecting a remote mode of operation or a network mode of operation. The analog front end further includes a transmit converter for converting the transmit data at the baud rate to a digital output at a transmit rate and a digital to analog converter for converting the digital output to an analog signal, and an analog to digital converter for converting the analog receive signal to a digital receive signal and a receive converter for converting the digital receive signal at a receive rate to the baud rate. The phase detector includes a channel estimator for generating a coefficient error signal and the timing controller includes a loop filter for producing a control signal for a numerically controlled oscillator that produces a baud interrupt signal and the phase control signals.

8 Claims, 4 Drawing Sheets ns of the present
specification, the present invention discloses an apparatus
for recovering timing of a digital signal for a transceiver.

APPARATUS FOR RECOVERING TIMING OF A DIGITAL SIGNAL FOR A TRANSCEIVER

BACKGROUND OF THE INVENTION

1. Field of the Invention

This invention relates in general to digital signal transmission, and more particularly to an apparatus for recovering timing of a digital signal for a transceiver.

2. Description of Related Art

The telephone networks currently in place were originally designed for transmission of electrical signals carrying human speech. Since human speech is generally confined within a band ranging from 0 Hertz to 3,400 Hertz, telephone networks were designed to provide telephone lines to each user which were capable of handling frequencies within this range. Today, these same telephone lines, which connect a service user to a central office, are in place, permitting communication of only voice data or analog modem transmissions of not more than 56,000 bits per second. However, connections between central offices of telephone networks are provided by high-bandwidth fiber optic transmission facilities in nearly every telephone network worldwide.

Because the equipment that connects an end user to a central office is only capable of handling frequencies of up to 3,400 Hertz, communication equipment utilizing these lines, such as dial modems or fax modems, have been accordingly limited in bandwidth. Despite the presence of high bandwidth fiber optic lines between central offices, users remain limited in the bandwidth available to them because the local lines serve as a bottleneck. New technologies, such as the Internet access or video conferencing, demand that the bottleneck be removed.

Digital Subscriber Line (DSL) technologies are capable of removing the bottleneck. DSL permits a user to communicate over the existing telephone lines at a rate of tens of millions of bits per second. In order to utilize DSL, a site must be equipped with a transceiver (a DSL modem) which communicates, via the existing telephone lines, with another transceiver located at the central office of the network access provider, generally the local telephone company.

As already stated, DSL transceivers are designed to operate at high data rates. The DSL transceiver operates either in a network (central office) or remote mode. In a network mode, a transceiver only needs to acquire the phase of the received signal because the received signal is frequency locked at the remote transceiver to the network transmitter. Further, in the remote mode, the transceiver must frequency and phase lock to the incoming data stream. The transceiver may also be capable of variable rate transmission.

To simplify the transceiver structure and to allow a variable rate of transmission, it can be seen that there is a need for an apparatus for performing timing recovery wherein the baud rate conversion is independent of the sampling rate.

It can also be seen that there is a need for recovering timing of a digital signal for a transceiver wherein the timing recovery system may be set in a network mode or a remote mode.

SUMMARY OF THE INVENTION

To overcome the limitations in the prior art described above, and to overcome other limitations that will become apparent upon reading and understanding the present specification, the present invention discloses an apparatus for recovering timing of a digital signal for a transceiver.

The present invention solves the above-described problems by providing an apparatus for performing timing recovery wherein the baud rate conversion is independent of the sampling rate. The timing for a digital signal at a transceiver is determined by the timing recovery system, which may be set in a network mode or a remote mode.

A system in accordance with the principles of the present invention includes a transceiver core having an input side and an output side, the transceiver core processing transmit and receive data at a predetermined baud rate, an analog front end, coupled to the transceiver core, for transmitting and receiving analog signals over a network, a phase detector, coupled to the transceiver core, the phase detector generating a phase error estimate signal based upon a sampling of a received signal at the transceiver core and a timing controller, coupled to the phase detector, for receiving the phase error estimate signal and generating a receive and transmit phase control signal for controlling timing of the analog front end, wherein the timing or sampling of the analog front end is independent of the baud rate. The timing controller may further include a selector for selecting a remote mode of operation or a network mode of operation.

Other embodiments of a system in accordance with the principles of the invention may include alternative or optional additional aspects. One such aspect of the present invention is that the analog front end further includes a transmit converter for converting the transmit data at the baud rate to a digital output at a transmit rate and a digital to analog converter, coupled to the transmit converter, for converting the digital output to an analog signal.

Another aspect of the present invention is that the analog front end further includes an analog to digital converter for converting the analog receive signal to a digital receive signal and a receive converter for converting the digital receive signal at a receive rate to the baud rate.

Another aspect of the present invention is that the digital to analog converter is clocked at a predetermined frequency according to a clock input signal.

Another aspect of the present invention is that the phase detector further includes a channel estimator for generating a coefficient error signal that is used to tune the channel estimator and for generating a phase reference value, and a comparator for receiving the phase reference signal from the channel estimator and a nominal reference value for processing to generate a phase error estimate of the received signal.

Another aspect of the present invention is that the channel estimator includes a linear equalizer having a plurality of taps, the taps being weighted according to the coefficient error signal, the weighted taps being summed by a first summer to generate a composite channel estimate signal and an error generator, coupled to the linear equalizer, for receiving the composite channel estimate and calculating the difference between the composite channel estimate and a channel reference value to produce the coefficient error signal.

Another aspect of the present invention is that the timing controller further includes a loop filter for filtering the phase error estimate and producing a control signal, a numerically controlled oscillator for producing a baud interrupt signal and the phase control signals, and a selector, wherein the selector further includes a network input signal and a remote input signal, the network input signal being applied to select the network mode and to lock to the phase of the receive signal by running the numerical controlled oscillator at a nominal numerical controlled oscillator frequency with a variable phase offset, and the remote input signal being applied to select the remote mode and to lock to the frequency and phase of the receive signal by setting the frequency of the numerical controlled oscillator using the output of the loop filter.

Another aspect of the present invention is that the analog front end further includes a transmit converter, the transmit converter converting the timing of the transmit data from the transmit baud rate to a predetermined transmit signal frequency by interpolating the transmit baud rate signal by a fixed amount, filtering the interpolated signal to remove alias noise and decimating the filtered signal by a variable amount.

Another aspect of the present invention is that the analog front end further includes a receive converter, the receive converter converting the timing of the receive signal to the receive baud rate by interpolating the receive signal by a fixed amount, filtering the interpolated receive signal to remove alias noise, and decimating the filtered signal by a variable amount.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a digital timing recovery system. The digital timing recovery system according to the present invention eliminates the need for an analog PLL, performs variable rate transmission with a fixed analog front end, and utilizes a fixed clock reference for all rates. Variable digital decimation/interpolation filters are used to correctly transmit/receive data. A digital PLL is used to control the frequency and phase recovery of the receiver. The timing recovery system operates in two modes: Network and Remote. In the Network mode, the receiver acquires phase only, as the receive signal is frequency locked to the transmitter. In the Remote mode, the receiver must frequency and phase lock to the incoming data stream.

Figure 1:
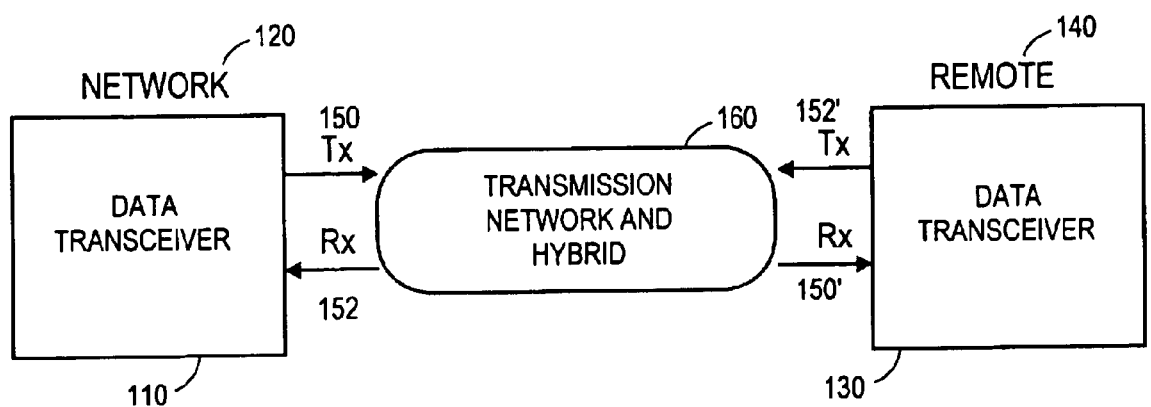
FIG. 1 illustrates a reference model of digital timing recovery systems according to the present invention.

FIG. 1 illustrates a reference model 100 of digital timing recovery systems according to the present invention. A data transceiver 110 at the network side 120 transmits data to a remote transceiver 130 at a remote side 140. The remote transceiver 130 transmits data to the network transceiver 110. Network timing is conveyed by the transmit data stream 150 at the network side 120. At the remote side 140, the remote transceiver 130 locks to the frequency of the transmit data stream 150 and uses this timing for transmitting the receive data stream 152'. At the network receiver 110, the frequency of the receive signal 152 is known because the receive data stream 152 is frequency locked at the remote side 140 to the network transmitted data stream 150'. Due to delays in the transmission network 160, the phase of the receive signal 152 at the network transceiver 110 must be determined. The network transceiver 110 is the system timing master. The network received signal 152 is frequency locked to the network transmit signal 150, but is not phase aligned. The network transceiver 110 recovers the phase. The remote receive signal 150' conveys network timing. The remote transceiver 130 must frequency lock the receive signal 152' to the transmit signal 150'. The remote transceiver 130 must transmit at the same rate as received by the remote transceiver 130.

Figure 2:
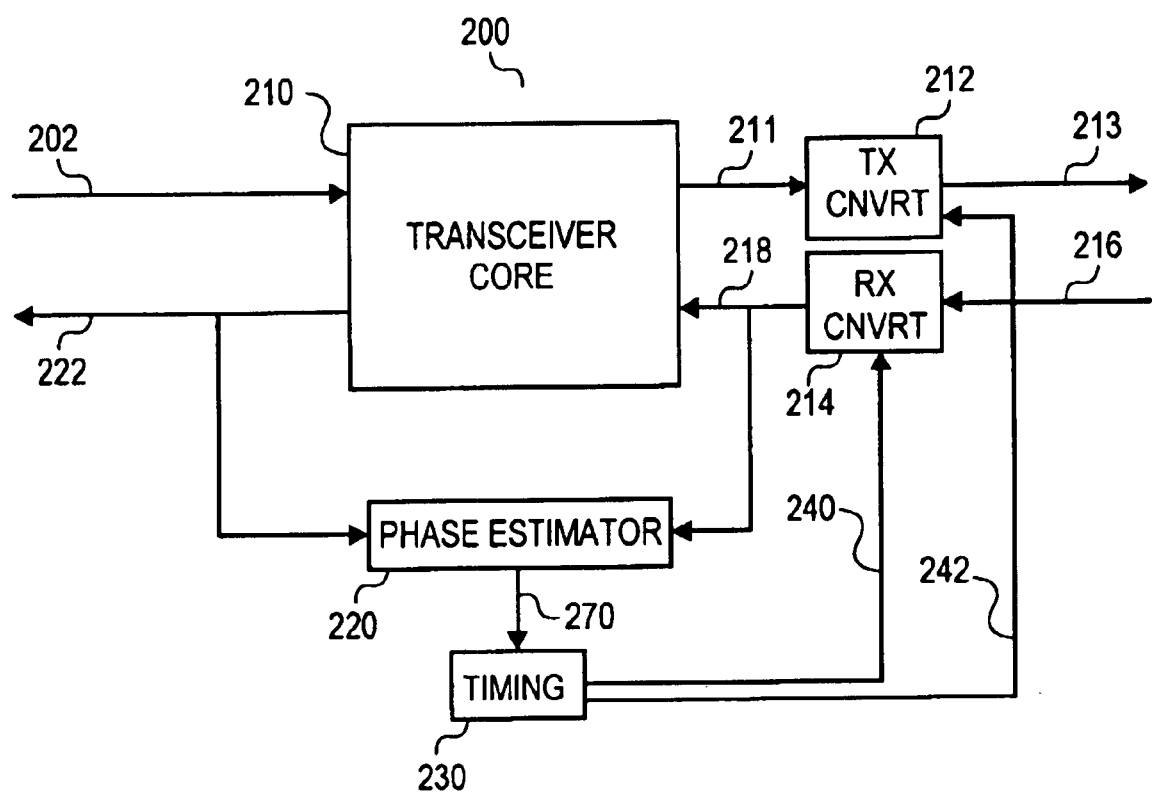
FIG. 2 illustrates a block diagram of a timing recovery system according to the present invention.

FIG. 2 illustrates a block diagram of a timing recovery system 200 according to the present invention. In FIG. 2, a transceiver core 210 receives a transmit signal 202 which is processed by the transceiver core 210, which in turn passes a processed transmit signal 211 to the transmit rate converter 212. The transmit rate converter receives the transmit signal and converts it to produce a converted transmit signal 213. A receiver rate converter 214 receives the receiver signal 216 and passes a converted receiver signal 218 to the transceiver core 210, which processes the signal to produce the receiver output signal 222. A phase error estimator 220 estimates the difference in phase between the converted receiver signal 218 and the receiver output signal 222. The phase error estimate signal 270 is passed to the timing block 230. Timing block 230 then produces signals 240, 242 for controlling the receiver rate converter 214 and transmit converter 212.

Figure 3:
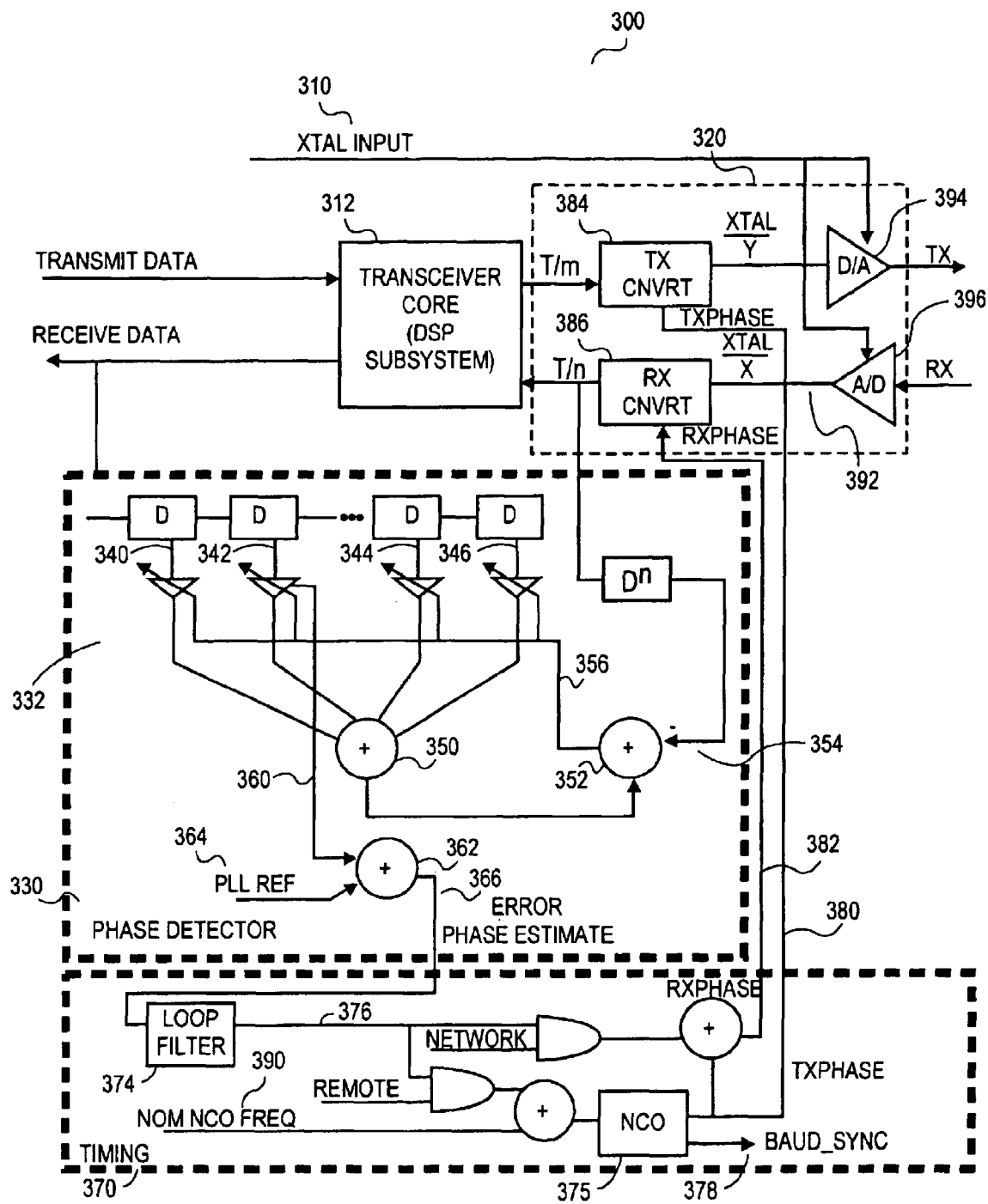
FIG. 3 illustrates a more detailed block diagram of the timing recover system according to the present invention.

FIG. 3 illustrates a more detailed block diagram 300 of the timing recover system according to the present invention. The sampling of the analog signal is based off clock signal XTAL input 310. Clocking of the other components is performed using a clock that may or may not be derived from XTAL 310. XTAL 310 can be asynchronous to the baud rate (T) of the system. A sync pulse BAUD-SYNC 378 occurs periodically to indicate the baud timing. All processing is performed by the transceiver core upon receipt of a BAUD_SYNC signal 378. The DSP sub-system 312 is responsible for all core transceiver functions. The conversion block 320 produces a receive sample at the baud rate or multiples of the buad rate and the conversion block 320 takes in a transmit sample at the baud rate or multiples of the baud rate. Those skilled in the art will recognize that the term "multiples of the baud rate" which is used throughout this discussion is meant to include N×baud rate, where N may or may not be equal to 1.

Figure 4:
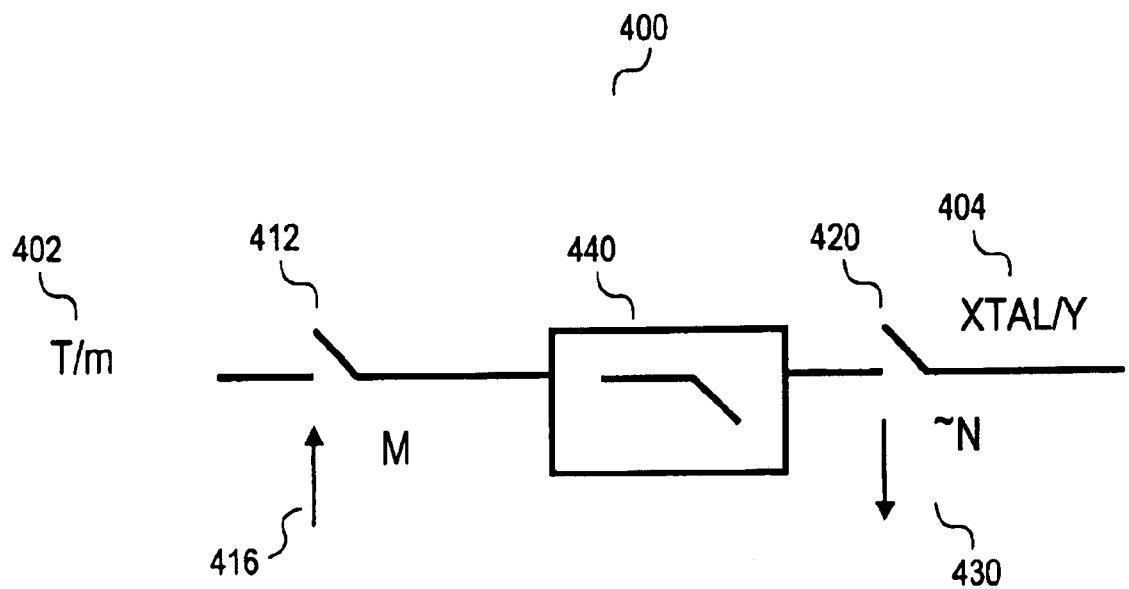
FIG. 4 illustrates a more detailed block diagram of the transmit converter according to the present invention.

FIG. 4 illustrates a more detailed block diagram of the transmit converter 400. As described above, the transmit converter 400 is used to convert the timing from the transmit baud rate or multiples of the baud rate, T/m 402, to XTAL/Y 404 at the A/D rate. The transmit converter 400 operates by interpolating 412 the transmit signal, T/m 402 (where m is an integer), by a fixed amount, M 416, then decimating 420 the signal by a variable amount ~N 430. N is not a fixed amount and will vary dynamically. The long-term average of M/N will represent exactly the relation between T/m 402 and XTAL/Y 404. The input frequency of the transmit signal may be T 404 (where m=1), or some other frequency related to the baud rate, such as T/4 (where m=4). The filter 440 is a low pass filter designed to remove alias noise before the decimation 420. N is modified according to the TX_PHASE signal 380 as shown in FIG. 3 to control the conversion rate.

Figure 5:
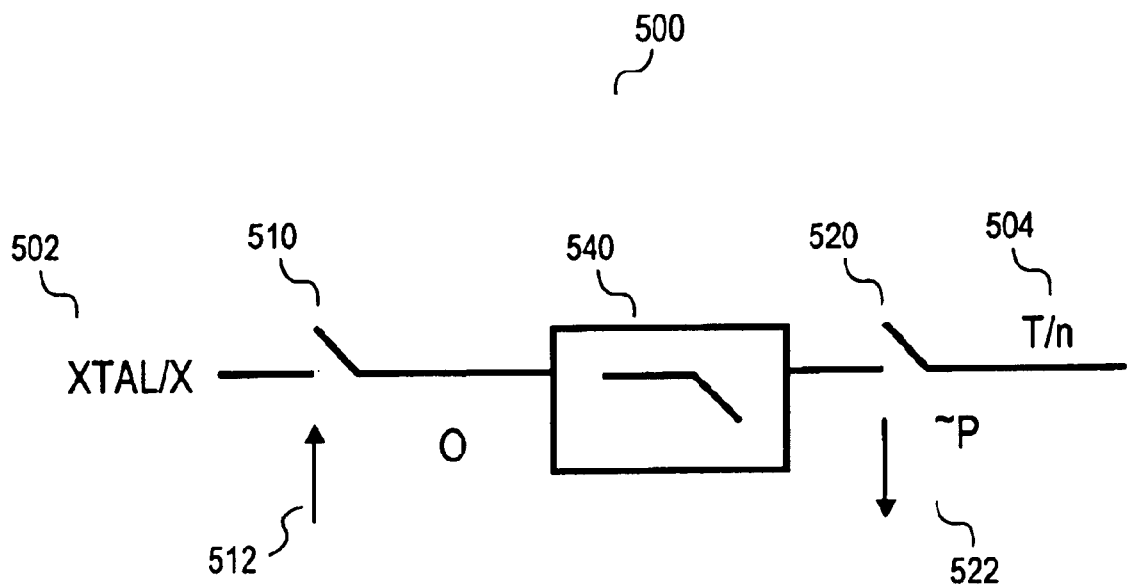
FIG. 5 illustrates a block diagram of the receiver converter according to the present invention.

FIG. 5 illustrates a block diagram of the receiver converter 500. The receive converter 500 is the complement of transmitter converter described with reference to FIG. 4. The receive converter 500 is used to convert the timing from the analog sampling rate of XTAL/X 502 to T/n 504 (where n is an integer not necessarily equal to m). The receiver converter 500 works by interpolating 510 the XTAL/X signal by a fixed amount O 512. The signal is then decimated 520 by a variable amount ~P 522. The average ratio of O/P represents the ratio between T/n 504 and XTAL/X 502. The filter 540 is a low pass filter designed to remove alias noise before the decimation 520. The output frequency of the block may be T 504 (where n=1) or some other frequency related to the baud rate, such as T/4 (where n=4). P is modified according to the RX_PHASE signal 382 as shown in FIG. 3 to control the conversion rate.

Returning to FIG. 3, the phase detector 330 utilizes a linear equalizer 332 that converges to the response of the channel. The equalizer 332 acts as a channel estimator and includes one of more equalizers taps 340–346 that can be combined 350 and compared 352 to a reference signal 354 to generate a error signal 356 for controlling the weighting of the taps 340–346. As shown in FIG. 3, for example, only one of the weights is used as the timing reference 360. However, those skilled in the art will recognize that combinations of taps may-be processed to provide a timing reference 360. The reference 360 is compared 362 to a nominal reference value 364 to generate a phase error estimate 366 of the receive signal.

The timing controller block 370 includes an NCO 372 (numerically controlled oscillator) and loop filter 374. The timing controller block 370 produces output signals TX_PHASE 380 and RX_PHASE 382 to control the transmit 384 and receive 386 converters. The loop filter 374 is used to filter the phase error estimate 366 and produce a control signal 376 for the NCO 372. The NCO 372 produces a baud interrupt 378, and phase control signals 380, 382 for the transmit 384 and receive 386 converters. The nominal frequency of the NCO 372 is set by parameter "NOM NCO FREQ" 390.

In the network mode of operation, the NCO 372 is "free running" at the nominal NCO frequency 390; it conveys the network timing to the remote terminal. In this mode, the phase signal 382 of the receive converter 386 is controlled by the output of the loop filter 374. Thus, by controlling the phase of the receive converter 386, the network terminal can lock to the phase of the receive signal 392. The degree of phase control depends on the output scaling of the loop filter 374, and the span in baud time of the filter of the receive converter 386. As an example, the receiver could be designed to pull over a range of +−2 baud periods. However, those skilled in the art will recognize that the invention is not meant to be limited to such a design.

In the remote mode of operation, the phase for the transmit 384 and receive 386 converters are identical, whereas the oscillation frequency of the NCO 372 is controlled by the output of the loop filter 374. Thus by controlling the frequency of the NCO 372, the remote terminal can lock to the frequency and phase of the receive signal 392. The degree of frequency control depends on the output scaling of the loop filter 374, and the sensitivity of the NCO 372. As an example, the receiver could be designed to pull over a range of +−120 ppm (parts per million). However, those skilled in the art will recognize that the invention is not meant to be limited to such a design.

In summary, the present invention provides a digital timing recovery system that includes A/D and D/A converter sampling with a fixed frequency that may be unrelated to the baud rate (T) timing of the system. Transmit and receive rate converters that convert the A/D and D/A data to the transceiver Baud rate. The filters consist of interpolation, alias rejection, and variable decimation, depending on a control signal. A DSP sub-system for core transceiver functions and a phase detector including a channel estimating linear filter is used to derive a phase error estimate of the receive signal. A loop filter is used to smooth the phase error estimate and a NCO is used to create baud timing and phase information for the rate converters. A combining circuit allows the loop filter output to affect the phase information for the RX converter. This is used to recover "phase only" timing for network applications. A combining circuit also allows the loop filter output to affect the frequency of the NCO. This is used to recover frequency and phase for remote applications.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A timing recovery system, comprising:
   a transceiver core having an input side and an output side, the transceiver core processing transmit and receive data at a predetermined baud rate;
   an analog front end, coupled to the transceiver core, for transmitting and receiving analog signals over a network;
   a phase detector, coupled to the transceiver core, the phase detector generating a phase error estimate signal based upon a sampling of a received signal at the transceiver core; and
   a timing controller, coupled to the phase detector, for receiving the phase error estimate signal and generating a receive and transmit phase control signal for controlling timing of the analog front end;
   wherein the phase detector further comprises:
      a channel estimator for generating a coefficient error signal that is used to tune the channel estimator and for generating a phase reference value; and
      a comparator, coupled to the channel estimator, the comparator receiving the phase reference value from the channel estimator and a nominal reference value for processing to generate the phase error estimate signal of the received signal.

2. The timing recovery system of claim 1 wherein the channel estimator comprises:
   a linear equalizer having a plurality of taps, the taps being weighted according to the coefficient error signal, the weighted taps being summed by a first summer to generate a composite channel estimate signal; and an error generator, coupled to the linear equalizer, for receiving the composite channel estimate signal and calculating the difference between the composite channel estimate signal and a channel reference value to produce the coefficient error signal.

3. A timing recovery system, comprising:

a transceiver core having an input side and an output side, the transceiver core processing transmit and receive data at a predetermined baud rate;

an analog front end, coupled to the transceiver core, for transmitting and receiving analog signals over a network;

a phase detector, coupled to the transceiver core, the phase detector generating a phase error estimate signal based upon a sampling of a received signal at the transceiver core; and a timing controller, coupled to the phase detector, for receiving the phase error estimate signal and generating a receive and transmit phase control signal for controlling timing of the analog front end;

wherein the timing controller further comprises:

a loop filter for filtering the phase error estimate signal and producing a control signal;

a numerically controlled oscillator for producing a baud interrupt signal and the phase control signal; and a mode selector, wherein the mode selector further comprises a network input signal and a remote input signal, the network input signal being applied to select a network mode and to lock to the phase of the received signal by running the numerical controlled oscillator at a nominal numerical controlled oscillator frequency with a variable phase offset, and the remote input signal being applied to select a remote mode and to lock to the frequency and phase of the received signal by setting the frequency of the numerical controlled oscillator using the output of the loop filter.

4. A timing recovery system, comprising:

a transceiver core having an input side and an output side, the transceiver core processing transmit and receive data at a predetermined baud rate;

an analog front end, coupled to the transceiver core, for transmitting and receiving analog signals over a network;

a phase detector, coupled to the transceiver core, the phase detector generating a phase error estimate signal based upon a sampling of a received signal at the transceiver core; and a timing controller, coupled to the phase detector, for receiving the phase error estimate signal and generating a receive and transmit phase control signal for controlling timing of the analog front end;

wherein the analog front end further comprises a transmit converter, the transmit converter converting the timing of the transmit data from a transmit baud rate to a predetermined transmit signal frequency by interpolating the transmit data by a fixed amount, filtering the interpolated signal to remove alias noise and decimating the filtered signal by a variable amount as controlled by the phase control signal.

5. A timing recovery system, comprising:

a transceiver core having an input side and an output side, the transceiver core processing transmit and receive data at a predetermined baud rate;

an analog front end, coupled to the transceiver core, for transmitting and receiving analog signals over a network;

a phase detector, coupled to the transceiver core, the phase detector generating a phase error estimate signal based upon a sampling of a received signal at the transceiver core; and a timing controller, coupled to the phase detector, for receiving the phase error estimate signal and generating a receive and transmit phase control signal for controlling timing of the analog front end;

wherein the analog front end further comprises a receive converter, the receive converter converting the timing of the received signal to a receive baud rate by interpolating the received signal by a fixed amount, filtering the interpolated receive signal to remove alias noise, and decimating the filtered signal by a variable amount as controlled by the phase control signal.

6. A method for performing timing recovery comprising:

processing transmit and receive data at a predetermined baud rate using a transceiver core;

transmitting and receiving analog signals over a network via an analog front end coupled to the transceiver core;

generating a phase error estimate signal based upon a sampling of a received signal at the transceiver core;

receiving the phase error estimate signal; and generating a receive and transmit phase control signal for controlling timing of the analog front end;

wherein the generating a phase error estimate signal further comprises generating an error signal, the error signal being used to tune a channel estimator and to generate a phase reference value, and receiving the phase reference value from the channel estimator and a nominal reference value for processing to generate the phase error estimate signal of the received signal.

7. The method of claim 6 wherein the generating an error signal further comprises weighing a plurality of taps in a linear equalizer according to the error signal, summing the weighted taps by a first summer to generate a composite channel estimate signal, receiving the composite channel estimate signal and calculating the difference between the composite channel estimate and a channel reference value to produce the error signal.

8. A method for performing timing recovery comprising:

processing transmit and receive data at a predetermined baud rate using a transceiver core;

transmitting and receiving analog signals over a network via an analog front end coupled to the transceiver core;

generating a phase error estimate signal based upon a sampling of a received signal at the transceiver core;

receiving the phase error estimate signal; and generating a receive and transmit phase control signal for controlling timing of the analog front end;

wherein the generating a receive and transmit phase control signal further comprises filtering the phase error estimate signal using a loop filter, producing a control signal, producing a baud interrupt signal and the phase control signal, applying a network input signal or a remote input signal, the network input signal being applied to select a network mode and to lock to the phase of the received signal by running a numerical controlled oscillator at a nominal numerical controlled oscillator frequency with a variable phase offset, and the remote input signal being applied to select a remote mode and to lock to the frequency and phase of the received signal by setting the frequency of the numerical controlled oscillator using an output of the loop filter.

* * * * *